July 29, 1947.    C. C. STUART    2,424,862
TAIL GATE ASSEMBLY
Filed Oct. 5, 1945    4 Sheets-Sheet 1
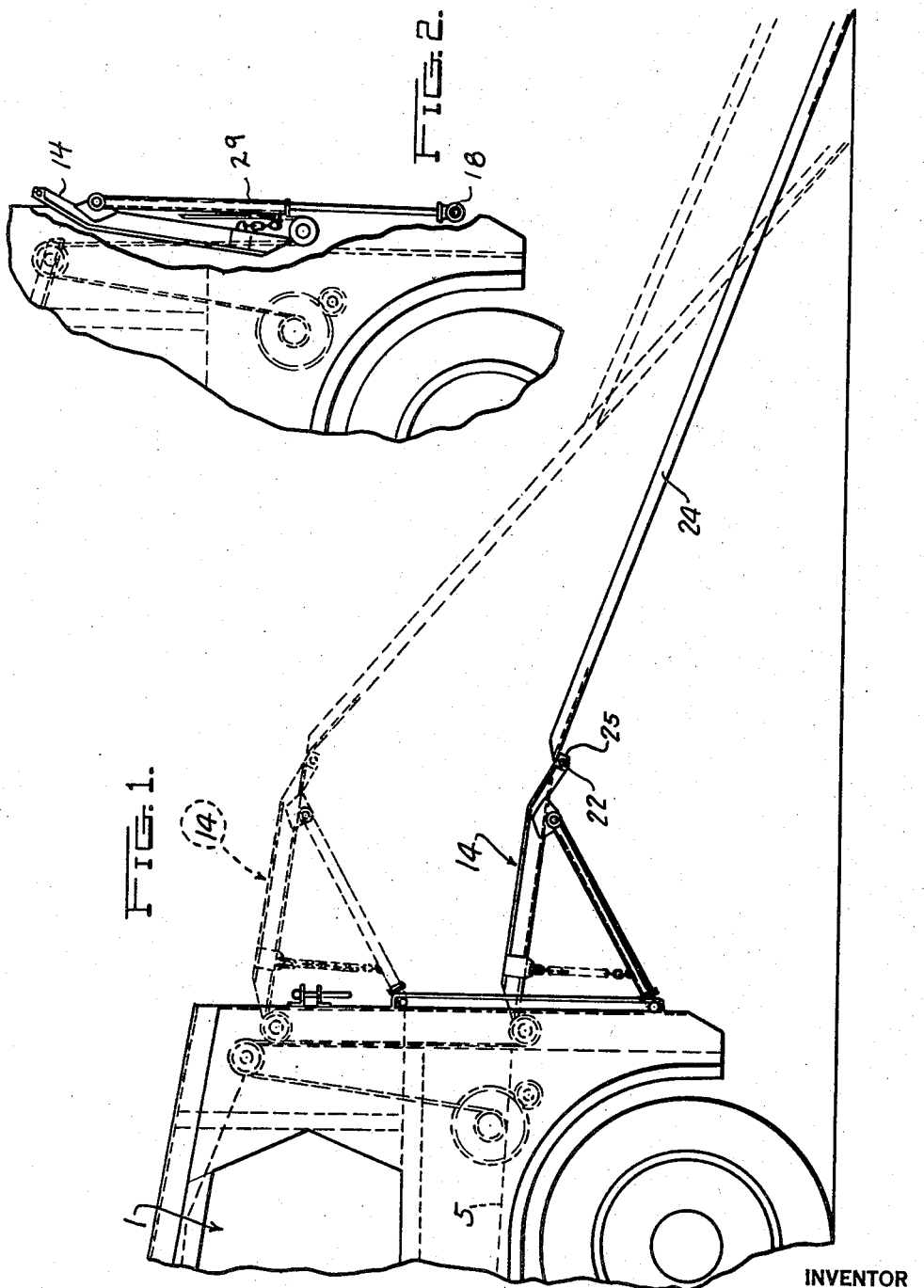
INVENTOR
Clarence C. Stuart
BY
Barnes, Kisselle, Laughlin & Raisch
ATTORNEYS

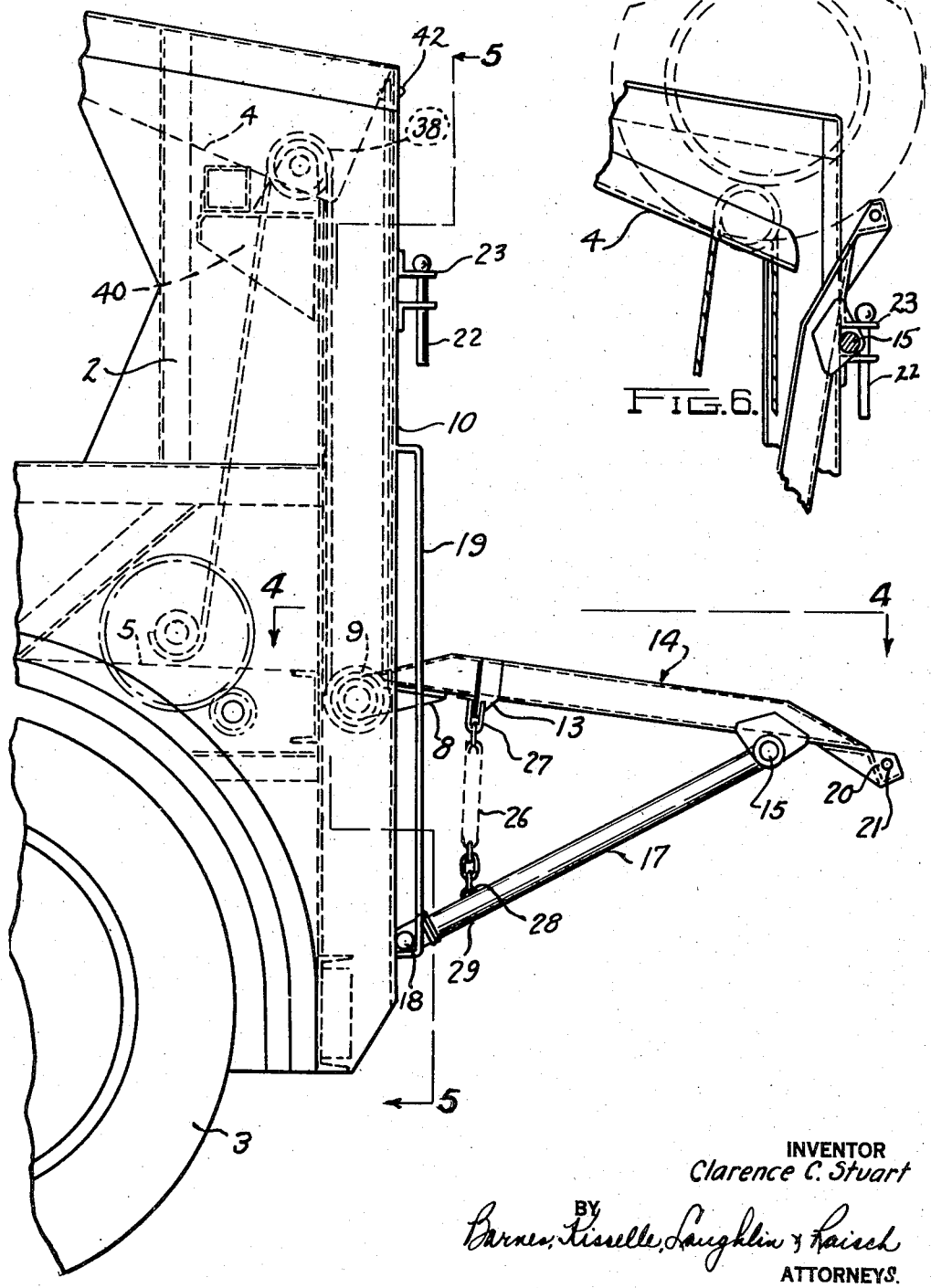

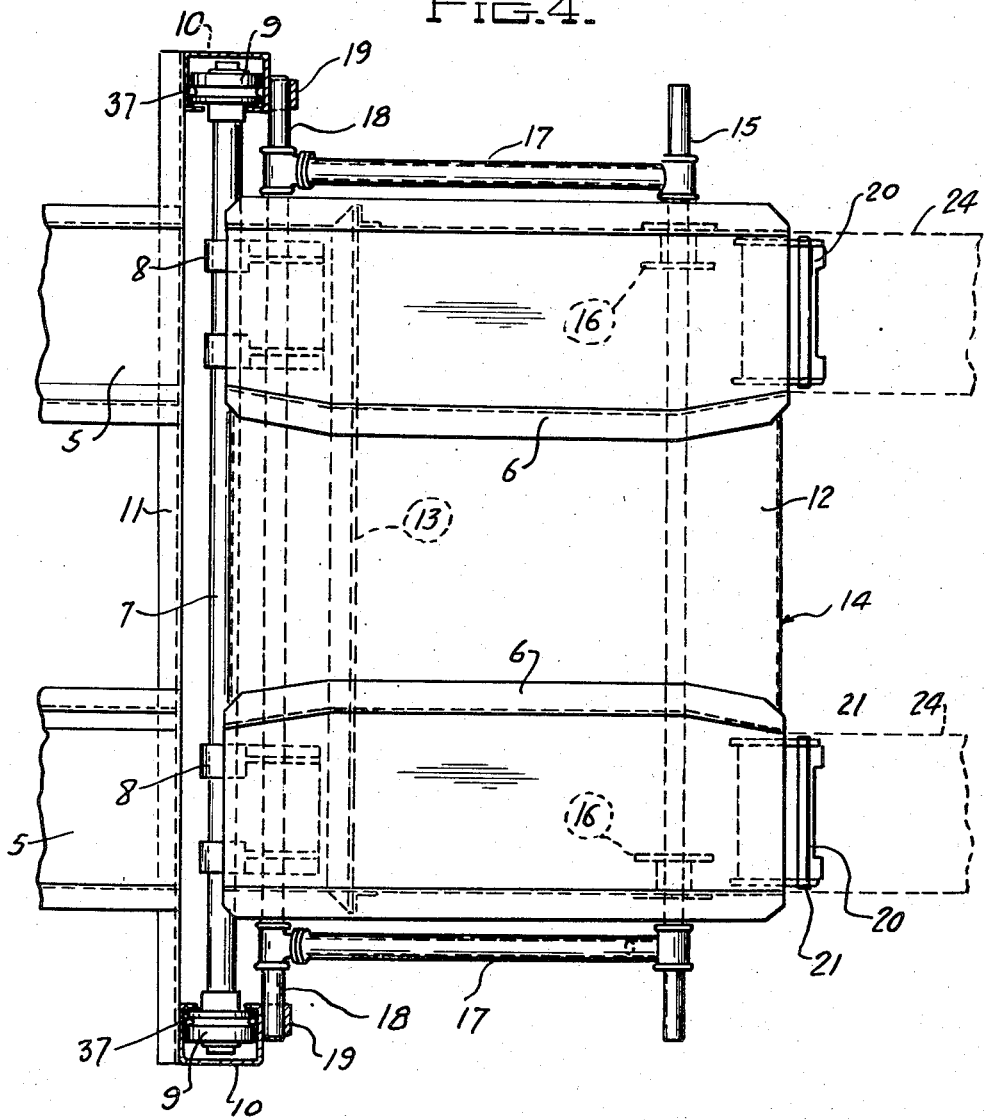

July 29, 1947.　　　C. C. STUART　　　2,424,862
TAIL GATE ASSEMBLY
Filed Oct. 5, 1945　　　4 Sheets-Sheet 4

INVENTOR
Clarence C. Stuart
BY
ATTORNEYS

Patented July 29, 1947

2,424,862

UNITED STATES PATENT OFFICE 2,424,862

TAIL GATE ASSEMBLY

Clarence C. Stuart, Dearborn, Mich., assignor to Traffic Transport Engineering, Inc., Dearborn, Mich., a corporation of Michigan Application October 5, 1945, Serial No. 620,465

10 Claims. (Cl. 214—85)

This invention relates to a tail gate assembly for an automotive vehicle and more particularly for a trailer for transporting automotive vehicles of the double deck type.

The invention contemplates a tail gate which is utilizable as a ramp upon which the car is rolled in loading the trailer. It is an object of the invention to produce such a tail gate which can be easily elevated and lowered. This object is accomplished by arranging the tail gate so that it can be raised and lowered by means of a mechanical lift.

The invention also contemplates a tail gate which can be utilized as a ramp, which is simple in structure and yet rugged and sturdy.

Fig. 1 is a side elevation showing my tail gate in two different loading positions.

Fig. 2 is a side elevation showing my tail gate in collapsed position.

Fig. 3 is a side elevation showing my tail gate in position for loading the lower deck of the trailer.

Fig. 4 is a section along the line 4—4 of Fig. 3.

Fig. 6 is a side elevation of the rear portion of the upper deck of the trailer loaded and with my tail gate in closed position.

Figure 5:
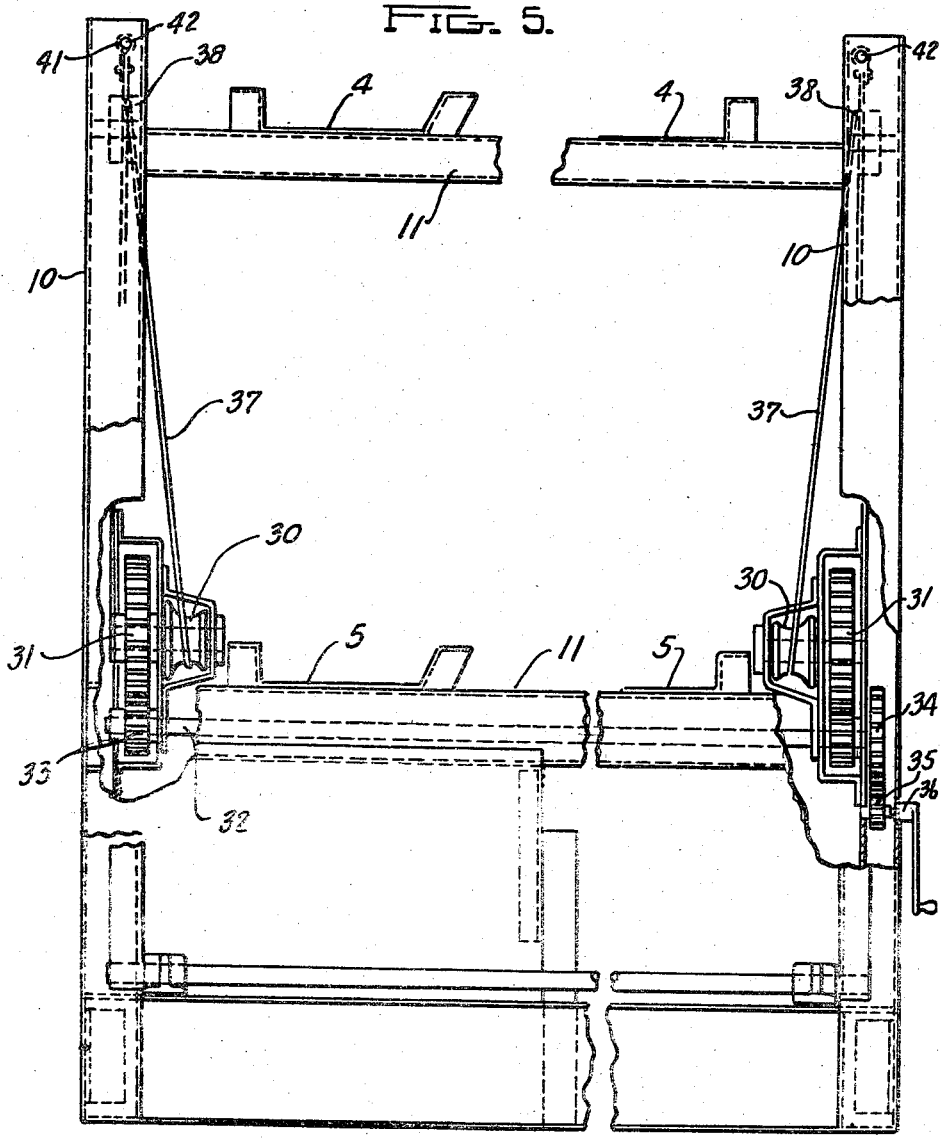
Fig. 5 is a section along the line 5—5 of Fig. 3.

Referring more particularly to the drawings there is shown the rear end of a trailer 1 for carrying automobiles comprising a conventional framework 2, wheels 3, upper deck tracks 4, lower deck tracks 5. The automobiles being transported on the trailer are rolled or loaded upon tracks 4 and 5 one above the other.

For loading the vehicles on these tracks, I have provided a combined tail gate and ramp comprising parallel track members 6 preferably in the form of metal channels which are pivoted on transverse shaft 7 by means of hinge brackets 8. Shaft 7 has pulley wheels 9 journalled on its opposite ends. Pulley wheels 9 are guided in vertical ways in the form of parallel channel members 10 welded or otherwise secured to the rear transverse frame members 11 of the trailer frame.

Track members 6 are connected together by a sheet steel panel 12 which is welded along its opposite edges to tracks 6. The tracks 6 are also strengthened by metal reinforcing member 13 which is welded to the underside of the track members. Thus, track members 6 with pan 12 form a tail gate for closing the rear end of the trailer. This tail gate will be generally referenced 14.

A shaft 15 is mounted on the underside of tail gate 14 parallel to its rear edge. Shaft 15 is supported in brackets 16 which are welded to the underside of tracks 6. A pair of telescoping struts 17 (comprising a rod arranged to slidably telescope within a tube) each are pivoted at one end upon shaft 15 and at its opposite end upon shaft 18 which is arranged to slide upwardly and downwardly in tracks 19 welded or otherwise fixed to guide channels 10. The rear end of each track 6 has welded thereto a hinge butt 20 provided with bores 21 for hinge pintles 22 which are stored in brackets 23 when not in use, Fig. 3. A pair of skids or ramps 24 also having bores 25 at their forward ends are arranged to be pivoted to hinge members 20 and connected thereto by hinge pintles 22, Fig. 1. Thus, skids 24 can be connected to tail gate 14 when in lowered position, Fig. 1, and readily elevated to the upper position, dotted line showing Fig. 1, because of the pivotal connection between skids 24 and tail gate 14.

Props 17 are each connected to tail gate 14 by chains 26 connected at their upper ends by shackles 27 to the underside of tail gate 14 and connected at their opposite ends with eyes 28 fixed on tubular members 29 of props 17.

For elevating the tail gate there is provided a crank operated winch comprising a pair of pulleys 30, reduction gearing 31, driving shaft 32 fixed at its opposite ends in gears 33, gear 34 fixed on one end of shaft 32, driving pinion 35 meshing with gear 34 and crank 36 for operating the winch. The winch is provided with the usual pawl which engages one of the gears of the winch to hold tail gate 14 in whatever position it is elevated. Pulleys 30 are arranged to have wrapped thereabout cables 37 which run over pulleys 38 supported on plates 40. Cables 37 also run under pulleys 9 and have their ends 41 looped about and secured to pins 42 secured in the upper ends of track members 10, Fig. 5. Thus, cables 37 by running around and under pulleys 9 support the front end of tail gate 14.

The operation of my combined tail gate and ramp is as follows: As shown in Fig. 1, tail gate 14 is in position for loading lower tracks 5. At this time the rear end of tail gate 14 is supported by props 17 and the front end of tail gate 14 is supported upon cables 37. To elevate the tail gate to loading position for upper tracks 4, the winch is operated to wind cables 37 upon drums 30, thus shortening the cable loop extending from supports 42 down around and under pulleys 9 and then upwardly over sheaves 38 which has the effect of raising the entire tail gate assembly from the position shown in the full lines to that shown in the dotted lines, Fig. 1. As the tail gate is raised, pulleys 9 roll in their channel tracks 10 and the outer ends of shaft 18 are guided in loops or tracks 19. Chains 26 which interconnect tracks 6 and props 17 carry the load of props 17 and require props 17 to move upwardly with tracks 6. Further, chains 26 prevent props 17 from slipping downwardly in tracks 19 when a load is applied on tail gate 14.

After the trailer is loaded, tail gate 14 is swung upwardly to the position shown in Fig. 2 so that tracks 6 and pan 12, as well as props 17, assume a substantially vertical position and close the end of the trailer. The ends of shaft 15 fit into brackets 23 and are retained therein by pintles 22. The tail gate 14 when closed extends above the rear ends of tracks 4 (Fig. 6) and acts as a stop against the rear wheels of the vehicle being transported on the upper deck.

It will be noted that tail gate 14 when in loading position for the lower deck (Figs. 1 and 3) extends rearwardly and downwardly at a small angle at the horizontal. The tail gate in this loading position permits loading of the lower deck with the use of but a single skid 24 for each of the tracks 6 of the tail gate. Thus, my tail gate obviates the need for two skids for each track such as required when loading the upper deck, dotted line showing Fig. 1. With my tail gate a single skid for each track 6 is sufficient and will permit the car to be loaded without either the front or rear bumper of the car being loaded either striking the skid or the ground.

I claim:

1. A tail gate assembly for a vehicle comprising vertical guideways on said vehicle, a gate, a pivotal connection between the gate and said guideways and guided for movement upwardly and downwardly in said guideways, prop means connected at one end to said gate remote from said pivotal connection and guided at the other end for movement upwardly and downwardly in a rectilinear path below said pivotal connection and adjacent said guideways whereby said gate can be swung to substantially horizontal position and elevated or lowered within said guideways to serve as a variable height ramp for loading said vehicle.

2. A tail gate assembly for a vehicle comprising vertical guideways on said vehicle, a gate, a pivotal connection between the gate and said guideways and guided for movement upwardly and downwardly in said guideways, prop means connected at one end to said gate remote from said pivotal connection and guided at the other end for movement upwardly and downwardly in a rectilinear path below said pivotal connection and adjacent said guideways, and means interconnecting the gate and said prop means for limiting the extent to which said prop means can pivot downwardly with respect to said gate whereby said gate can be swung to substantially horizontal position and elevated or lowered within said guideways to serve as a variable height ramp for loading said vehicle.

3. A tail gate assembly for a vehicle comprising spaced, parallel, vertical guideways adjacent the end of said vehicle, a tail gate, means pivotally connecting the tail gate and said guideways, said means being movable upwardly and downwardly in said guideways whereby said tail gate can be swung from a substantially upright position for closing the end of the vehicle to an approximately horizontal position to serve as a ramp in the loading of said vehicle, and prop means pivotally connected to the rearmost end of the tail gate when in position to serve as a ramp, said prop means extending downwardly and inwardly toward the end of said vehicle, and means for guiding the lower end of said prop means upwardly and downwardly adjacent said vertical guideways for the tail gate, and means interconnecting said tail gate and prop means to limit the angle between the prop means and the tail gate to an acute angle whereby the tail gate and prop means can be raised and lowered as a unit while the tail gate is extended for use as a ramp.

4. The combination as set forth in claim 3 including means operatively connected to said tail gate for raising and lowering the tail gate and prop means as a unit.

5. A tail gate assembly for a vehicle having a first and second deck, vertical guideways adjacent the end of said vehicle, a tail gate, means pivotally connecting the tail gate and said guideways whereby said tail gate can be swung from a substantially upright position for closing the end of the vehicle to an approximately horizontal position to serve as a ramp in the loading of said vehicles, said pivot means being movable upwardly and downwardly in said guideways, prop means pivotally connected to the tail gate adjacent its rear end when positioned to serve as a ramp, said prop means extending downwardly and forwardly toward the end of said vehicle, and means for guiding the lower end of said prop means upwardly and downwardly adjacent said vertical guideways for the tail gate, and stop means for holding said prop means at an acute angle with respect to said tail gate whereby said tail gate and prop means can be raised and lowered as a unit while the tail gate is extended for use as a ramp, and means for holding said tail gate substantially flush with either the first or second deck when used as a ramp.

6. The combination as set forth in claim 5 including a skid, a pivotal connection between the skid and the rear end of said ramp whereby said ramp can be elevated with the skid attached thereto.

7. The combination as set forth in claim 5 including a hoist mechanism for raising and lowering said tail gate assembly as a unit flush with either the first or second deck whereby the tail gate can be used as a ramp for loading the first and second deck.

8. A tail gate assembly for a vehicle having a first and second deck, vertical guideways adjacent the end of said vehicle, a tail gate, means pivotally connecting the tail gate and said guideways whereby said tail gate can be swung from a substantially upright position for closing the end of the vehicle to an approximately horizontal position to serve as a ramp in the loading of said vehicles, said pivot means being movable upwardly and downwardly in said guideways, prop means pivotally connected to the tail gate adjacent its rear end when positioned to serve as a ramp, said prop means extending downwardly and forwardly toward the end of said vehicle, and means for guiding the lower end of said prop means upwardly and downwardly adjacent said vertical guideways for the tail gate, a connection between the prop means and tail gate for holding the prop means at an acute angle with respect to the tail gate whereby said tail gate and prop means can be raised and lowered as a unit while the tail gate is extended for use as a ramp, and means for holding said tail gate substantially flush with either the first or second deck when used as a ramp, the said tail gate being swingable into a substantially upright position to serve as a closure for the rear end of the vehicle 9. A tail gate assembly for a vehicle comprising spaced, parallel, vertical guideways adjacent the end of the vehicle, a tail gate, rollers arranged to travel upwardly and downwardly in said guideways, shaft means connecting said rollers with the forward end of said tail gate, prop means connected to the tail gate and extending forwardly and downwardly for supporting said tail gate in a substantially horizontal position whereby the tail gate can be used as a ramp, means for guiding the forward end of said prop means upwardly and downwardly adjacent the rear end of said vehicle, hoist means including cables extending from a point adjacent the top of said guideways downwardly and around said rollers and then upwardly to a point adjacent the top of said guideways whereby when the hoist is operated to shorten said cable the tail gate and prop assembly is elevated as a unit while the tail gate is in position to serve as a ramp.

10. A tail gate assembly for a vehicle having upper and lower loading decks comprising spaced vertical guideways at each side of said vehicle extending between the lower portion of said vehicle and the rear end of said upper loading deck, a gate, a pivotal connection between the gate and said guideways, and prop means connected at one end to said gate remote from said pivotal connection and guided for movement at the other end upwardly and downwardly below said pivotal connection whereby said gate may be swung downwardly about said pivotal connection and adjusted vertically in said guideways in horizontal alignment with either the upper or lower deck to serve as a ramp for loading said vehicle.

CLARENCE C. STUART.

REFERENCES CITED

The following references are of record in the file of this patent:

UNITED STATES PATENTS

| Number | Name | Date |
|---|---|---|
| 1,627,135 | Arlo | May 3, 1927 |
| 2,110,239 | Richter | Mar. 8, 1938 |
| 2,236,317 | Howland | Mar. 25, 1941 |
| 2,251,358 | Judd et al. | Aug. 5, 1941 |

FOREIGN PATENTS

| Number | Country | Date |
|---|---|---|
| 367,805 | Great Britain | Feb. 24, 1932 |
| 443,253 | Great Britain | Feb. 25, 1936 |